(12) United States Patent
Kryeziu

(10) Patent No.: US 7,496,676 B2
(45) Date of Patent: Feb. 24, 2009

(54) METHODS, DATA STRUCTURES, AND SYSTEMS FOR PROCESSING MEDIA DATA STREAMS

(75) Inventor: Arben Kryeziu, Wailuku, HI (US)

(73) Assignee: Maui X-Stream, Inc., Lahaina, HI (US)

( * ) Notice: Subject to any disclaimer, the term of this patent is extended or adjusted under 35 U.S.C. 154(b) by 838 days.

(21) Appl. No.: 10/802,418

(22) Filed: Mar. 17, 2004

(65) Prior Publication Data

US 2004/0177151 A1    Sep. 9, 2004

Related U.S. Application Data

(63) Continuation-in-part of application No. 10/369,017, filed on Feb. 19, 2003, now Pat. No. 6,938,047.

(51) Int. Cl.
G06F 15/16 (2006.01)
(52) U.S. Cl. .................. 709/231; 709/233; 709/247
(58) Field of Classification Search ................ 709/231, 709/246, 247, 233
See application file for complete search history.

(56) References Cited

U.S. PATENT DOCUMENTS

| | | | |
|---|---|---|---|
| 5,721,827 A | 2/1998 | Logan et al. | |
| 6,195,497 B1 | 2/2001 | Nagasaka et al. | |
| 6,271,892 B1 | 8/2001 | Gibbon et al. | 348/700 |
| 6,501,794 B1 | 12/2002 | Wang et al. | 375/240.08 |
| 6,801,968 B2 | 10/2004 | Hunter | |
| 6,938,047 B2 | 8/2005 | Kryeziu | |
| 6,970,937 B1 * | 11/2005 | Huntington | 709/231 |
| 7,178,161 B1 | 2/2007 | Fristoe et al. | |
| 2001/0039659 A1 | 11/2001 | Simmons et al. | |
| 2002/0144276 A1 | 10/2002 | Radford et al. | |
| 2003/0061369 A1 | 3/2003 | Aksu et al. | |
| 2003/0079038 A1 | 4/2003 | Robbin | |
| 2003/0126608 A1 | 7/2003 | Safadi et al. | |
| 2004/0003102 A1 | 1/2004 | DuVall et al. | |
| 2004/0032348 A1 | 2/2004 | Lai et al. | |
| 2004/0045030 A1 | 3/2004 | Reynolds et al. | |

(Continued)

FOREIGN PATENT DOCUMENTS

WO    WO-0178303 A1    10/2001

(Continued)

OTHER PUBLICATIONS

"Search Report and Written Opinion for International Application No. PCT/US2005/009113", (Jun. 21, 2005), 13 pgs.

(Continued)

Primary Examiner—Frantz B Jean
(74) Attorney, Agent, or Firm—Schwegman, Lundberg & Woessner, P.A.

(57) ABSTRACT

Methods, systems, and data structures are provided for custom compressing, encrypting, and streaming media data. A requestor makes a request for media data and based on the connection rate of the requester a pixel resolution for the media data is customized and the media data is compressed. Optionally, the compressed media data is encrypted, such that only a customized media player knows the encryption algorithm needed to decrypt the encrypted media data. Next, the compressed media data and portions of a media player are streamed to the requestor.

14 Claims, 3 Drawing Sheets

U.S. PATENT DOCUMENTS

| | | | |
|---|---|---|---|
| 2004/0051812 A1 | 3/2004 | Hayward | |
| 2004/0162910 A1 | 8/2004 | Kryeziu | |
| 2005/0015509 A1* | 1/2005 | Sitaraman | 709/231 |
| 2005/0259639 A1 | 11/2005 | Kryeziu | |
| 2006/0242275 A1* | 10/2006 | Shapiro | 709/220 |
| 2007/0033265 A1* | 2/2007 | Anderson et al. | 709/217 |

FOREIGN PATENT DOCUMENTS

| | | |
|---|---|---|
| WO | WO-0227659 A2 | 4/2002 |
| WO | WO-2005091640 A1 | 9/2005 |

OTHER PUBLICATIONS

"A Streaming Media JukeBox", http://www.webreference.com/js/column51, (Oct. 25, 1999), 12 pgs.

"MPEG-4 Overview, V.21—Jeju Version", *International Organisation for Standardisation*, ISO/IEC JTC 1/SC29/WG11 N4668, Koenen, R., (ed.),(Mar. 2002), p. 60.

Houchin, J. S., et al., "File Format Technology in JPEG 2000 Enables Flexible Use of Still and Motion Sequences", *Signal Processing: Image Communication*, 17, (2002), 131-144.

Merz, M., et al., "Iterative Transmission of Media Streams", *Proceedings of ACM Multimedia '97*, (1997), 283-290.

WebRef.com, A Streaming Media JukeBox,(Oct. 25, 1999), 14.

"Non-Final Office Action mailed Sep. 20, 2007 in U.S. Appl. No. 11/191,781", OARN,21.

"U.S. Appl. No. 11/191,781, Non-Final Office Action mailed Sep. 26, 2008", OARN, 20 pgs.

\* cited by examiner

METHODS, DATA STRUCTURES, AND SYSTEMS FOR PROCESSING MEDIA DATA STREAMS

PRIORITY

The present application claims priority to and is a continuation-in-part of U.S. Application entitled: "Methods, Data Structures, and Systems for Processing Media Data Streams," having Ser. No. 10/369,017, filed on Feb. 19, 2003 now U.S. Pat. No. 6,938,047 the disclosure of which is incorporated by reference herein.

TECHNICAL FIELD

Embodiments of the present invention relate generally to media streaming, and more particularly to compressing, decompressing, and playing media data.

BACKGROUND INFORMATION

Media streaming is commonplace in today's highly connected economy. Consumers use streaming technology to play live broadcast over the Internet or to play stored media data. Streaming presents a number of problems for media service providers and media content providers. One of these problems relates to managing limited network bandwidth and providing acceptable response times to consumers that desire the media data.

Response time can be improved with two techniques, upgrading hardware for both the media service providers and the consumers and improving streaming software technology to more rapidly transmit the media data from the service providers and play the media data for the consumers on their computing devices. These two techniques are not mutually exclusive from one another. That is, often a combination of hardware and software techniques is used to improve delivery of media data over a network.

One software technique used in combination with streaming technology is data compression. Media data is voluminous and often includes video, image, graphical and audio data. Data compression attempts to represent that data in a smaller amount of physical space for purposes of transmission. When the compressed data is received from a consumer's computing device other software applications use decompression algorithms for reproducing the media data back to its original format for purposes of playing the decompressed media data within a media player. One commonly used compression format is the Motion Picture Expert's Group (MPEG) format. Often media players include a MPEG decompression application embedded within their instructions, such that decompression occurs seamlessly within the media player.

Although a variety of compression technologies are available in the industry, none of these compression technologies are customizable for purposes of improving the performance of streaming technology. In fact, the opposite is true in that the industry has been actively moving toward standard compression techniques, such as MPEG and others.

Industry standards for media data compression have benefits and drawbacks. Some benefits include the ability to freely develop applications to compress and decompress data using the standards and to integrate the compressed data in a variety of custom applications or of-the-shelf applications readily available in the marketplace. The drawbacks are that the compression used may not be modified easily and any changes made will take a long time to be integrated within the industry. Another drawback is that because a particular compression technique is readily known, it can lead to unauthorized consumption and distribution of media data to a large audience in a short period of time, where that audience often lacks proper licenses to consume or distribute the media data.

Moreover, because an industry standard compression technique is rigid, there is little opportunity to alter attributes associated with the media data. Attributes can include such things as pixel resolution and sound quality. Attributes do not affect the media content but do affect the media quality. In some cases, a consumer would willingly forgo some quality if the media data could be received and played in a timelier manner. Furthermore, in some cases a consumer's computing environment may not even be equipped to handle higher pixel resolutions and sound quality, such that degradation in quality is not even appreciably noticeable by the consumer. If quality can be altered within the compression technique, then, in some instances, the size of the media data can be substantially reduced.

Conversely, quality need not be always lowered, since in some situations a consumer may desire and be capable of processing media data in a higher quality format, then what the media data is natively stored in. In these, situations the ability to improve quality within the compressed media data may be desirable. Additionally, from a media content provider's perspective, the ability to custom compress, and in some cases custom encrypt, media data provides added security benefits for their media content, since the media data is not easily acquired, distributed, and played when the format and play of the media data is in proprietary formats.

Therefore, there is a need for improved implementations and techniques for distributing media players, compressing media data, encrypting media data, and playing media data.

SUMMARY OF THE INVENTION

Figure 1:
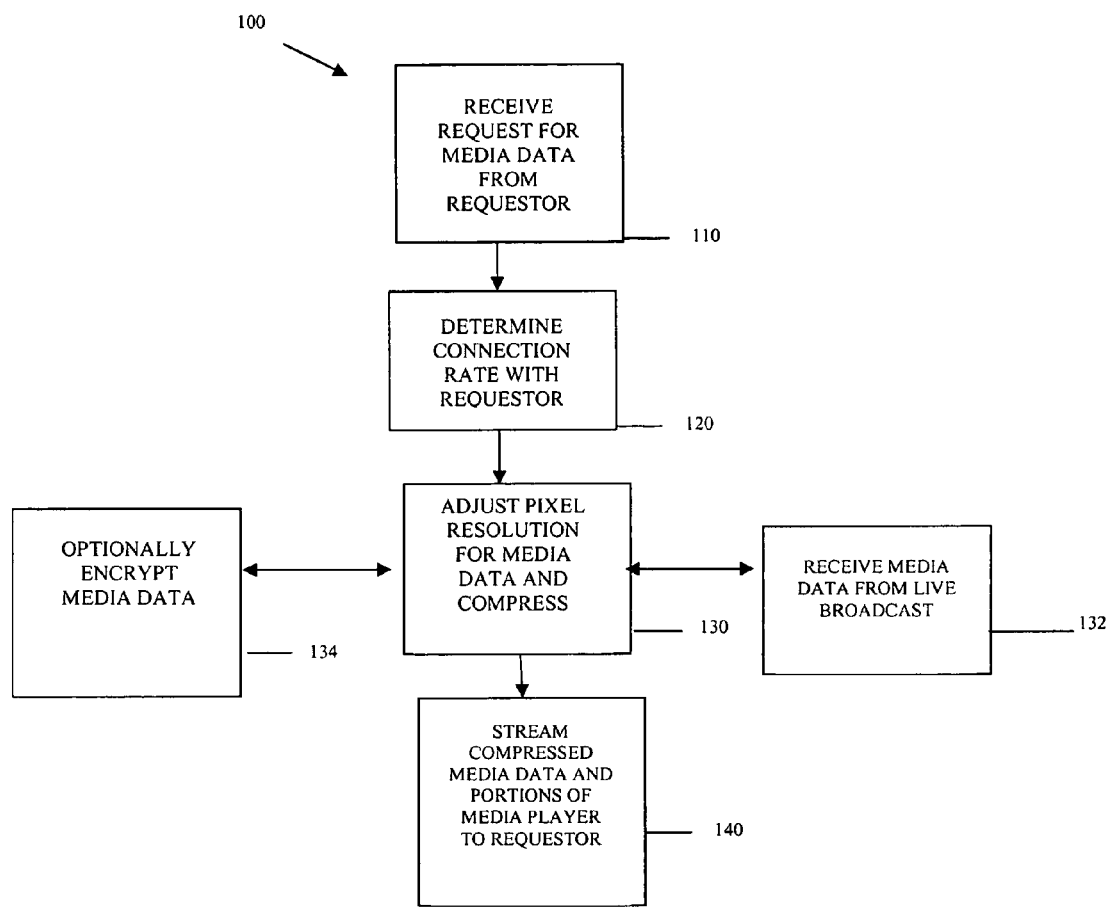
FIG. 1 is a flow diagram of a method for processing media data, in accordance with one embodiment of the invention.

In various embodiments of the present invention, techniques for processing media data are presented. Media data is compressed and sent along with portions of a media player to a requestor. The pixel resolution for the compressed media data is determined based on a connection rate associated with the requester. In some embodiments, the media data is also encrypted and the portions of the media player include the decryption algorithm necessary to decrypt the compressed media data.

More specifically and in one embodiment of the present invention, a method to process media data is described. A request for media data is received from a requestor. The media data is compressed with a custom pixel resolution based on a connection rate of the requester. Next, portions of a media player and the compressed media data are streamed to the requestor at the connection rate.

DESCRIPTION OF THE EMBODIMENTS

Novel methods, data structures, and systems for processing media data are described. In the following detailed description of the embodiments, reference is made to the accompanying drawings, which form a part hereof, and in which is shown by way of illustration, but not limitation, specific embodiments of the invention that may be practiced. These embodiments are described in sufficient detail to enable one of ordinary skill in the art to understand and implement them, and it is to be understood that other embodiments may be utilized and that structural, logical, and electrical changes may be made without departing from the spirit and scope of the present disclosure. The following detailed description is, therefore, not to be taken in a limiting sense, and the scope of the embodiments of the inventions disclosed herein is defined only by the appended claims.

As used herein the phrase "media data" includes data that is related to multimedia such as, by way of example only, audio, video, graphical, image, text, and combinations of the same. Streaming refers to breaking media data up into configurable byte chunks, blocks, or frames and serially transmitting these pieces over a network to a one or more recipients' computing devices. The network can be hardwired (e.g., direct (point-to-point), indirect (e.g., Wide Area Network (WAN), such as the Internet), and others). The network can also be wireless (e.g., Infrared, Radio Frequency (RF), Satellite, Cellular, and others). Furthermore, the network can be a combination of hardwired and wireless networks interfaced together.

A media player is one or more software applications that are designed to receive, decompress, if necessary, decrypt, if necessary, and play media data in a requestor's computing environment. Media players can be any existing available media player designed and modified to automatically load, configure, and process media data according to the teachings of the present disclosure, or a custom-developed media player designed to achieve the same. In one embodiment of the present invention, the media player is a JAVA applet that can be downloaded, loaded, and executed within an application of a requestor's computing device (e.g., WWW browser, and others) without any manual intervention.

The media player of the present invention, is designed and performed according to the teachings of co-pending U.S. Application entitled: "Methods, Data Structures, and Systems for Processing Media Data Streams," having Ser. No. 10/369,017, filed on Feb. 19, 2003 the disclosure of which is incorporated by reference herein. The media player is included within a media stream having at least a portion of desired media data, and it is designed to self-install and self-execute on a requestor's computing device for purposes of acquiring and playing the media data. In some embodiments, the media player is partially available from a World-Wide Web (WWW) browser page and exists as a partial script that when activated is designed to configure and acquire the remaining portions of the media player necessary to play the media data. In these embodiments, the first portion of the media player (script) contacts and acquires the remaining portion of the media player from an initial stream of media data that includes some of the initial media data that a fully assembled and configured media player will consume.

The initial media data that is processed by various embodiments of the present invention can be in any existing media data format. Thus, this format can be Moving Picture Expert Group (MPEG) format, an Audio Video Interleaved (AVI) format, and a Quicktime Movie Format (MOV). The media data format can also be encrypted for purposes of validation or can itself be in a compressed format.

A requestor is a consuming user or automated application that desires to play media data. A requestor makes a request for media data from a media service provider. The requester is associated with his/her own computing environment and connects with the media service provider over a network using an available connection rate of transmission.

FIG. 1 illustrates a flow diagram of a method 100 for processing media data, in accordance with one embodiment of the invention. Method 100 is implemented by one of more software applications on computer accessible media and is executed by a computing device (e.g., any device having processing and memory capabilities). In one embodiment, the method 100 is implemented as a media service provider on a server accessible over a network, such as the Internet.

Initially, a requestor makes a request to the processing of the method 100 for purposes of acquiring media data that the requestor desires to play. Accordingly, at 110, the request for the media data is received. Next, at 120, a connection rate associated with the requestor is determined. At 130, based on the connection rate a desired pixel resolution is determined and using that pixel resolution the media data is compressed. Finally, at 140, a custom media player and the compressed media data are streamed to the requester at the connection rate. In some embodiments, a first portion of the custom media player is already accessible to the requester, such as via a WWW browser page, and that first portion assist the requestor in acquiring and configuring the remaining portions of the custom media player at 140.

In one embodiment, the connection rate associated with the requestor is determined and negotiated based on communications between the processing of the method 100 and the media player after it self-installs and self-executes on the requestor's computing device. That is, after the processing of the method 100 receives a request for the media data, the media player, or remaining portions of the media player as the case may be, is streamed directly to the requestor where it self installs and self executes, and immediately begins a direct dialogue of communication with the processing of the method 100. Once the media player is executing within the requestor's computing environment, it can manually interact with the requestor through interface screens to acquire a preferred pixel resolution for the desired media data and/or the connection rate of the requestor.

Alternatively, the media player can make its own determination for a desired pixel resolution for the media data based on the requestor's connection rate to the processing of the method 100. One way to do this is to assign a threshold value for a particular connection rate, such that connection rates below the threshold use a defined pixel resolution and connection rates above or at the threshold use another defined pixel resolution. Once the media player determines a connection rate and/or desired pixel resolution this is immediately communicated back to the processing of the method 100. Based on this information, the native media data is custom compressed with a custom pixel resolution that is optimal for the streaming the media data.

An optimal pixel resolution is one that is appropriate for the requestor based on the connection rate and optionally the computing capabilities of the requestor's computing device. A lower connection rate can indicate that the pixel resolution for the media data can be decreased. If the pixel resolution is decreased than the physical space needed to represent the media data in a compressed format can also be decreased. Thus, there is less data to distribute from the processing of the method 100 to the requestor's computing device over the network. Accordingly, by custom decreasing the pixel resolution of the media data the throughput of streaming can be improved. Conventionally, this has not been the case, since there has not been a capability to custom compress media data. Moreover, there has been no attempt to custom alter pixel resolution prior to media streaming.

The pixel resolution need not always be decreased. For example, if the media data is natively stored with a medium resolution or quality and the connection rate and/or computing capabilities of the requestor are high, then it may be that the media data is custom compressed to have a higher pixel resolution, such that the requester experiences improved quality.

Moreover, although various embodiments of this invention discuss pixel resolution as been altered for purposes of compression, it is readily apparent that any adjustable attribute of the media data can be custom altered prior to compression for purposes of customizing and improving the media streaming and media consumption. For example, sound quality of audio can be increased or decreased. Additionally, the custom quality can be manually identified by a requestor. That is, in some instances a requestor may want to see a video stream of desired media data, but may not want to hear the audio. This can happen when the requester is deaf or when the requestor simply wants to see the video only. In such cases, the ability to custom exclude the audio can result in a much smaller compressed size for the media data and improve the performance of the media streaming. In a like manner, there may be situations where audio is desired but video is not desired.

In another embodiment, at 134, the compressed media data can also be custom encrypted. The encryption algorithm can be customized for a particular requestor. The decryption algorithm can be custom configured within the media player. This provides an added level of security for media content providers, because each delivery instance of the media data can be protected according to licensing restrictions associated with a particular requester. The media data can not be decompressed and decrypted without the custom media player which comes with the media data, and the media player only knows the decryption algorithm necessary to decrypt the media data. Moreover, the media player communicates with the processing of the method 100 and can be used to enforce licensing restrictions for a particular requester. Thus, the media player will be of little use to someone who surreptitiously acquires it and the media content provider is assured of protected its rights in the media data.

In other embodiments, the media data can be natively stored at a location that is directly accessible to the processing of the method 100 or can be remote from the processing of the method 100. In one embodiment, the media data is acquired in real time and dynamically by the processing of the method 100, such as when the media data is being captured from a live broadcast, as depicted at 132.

Figure 2:
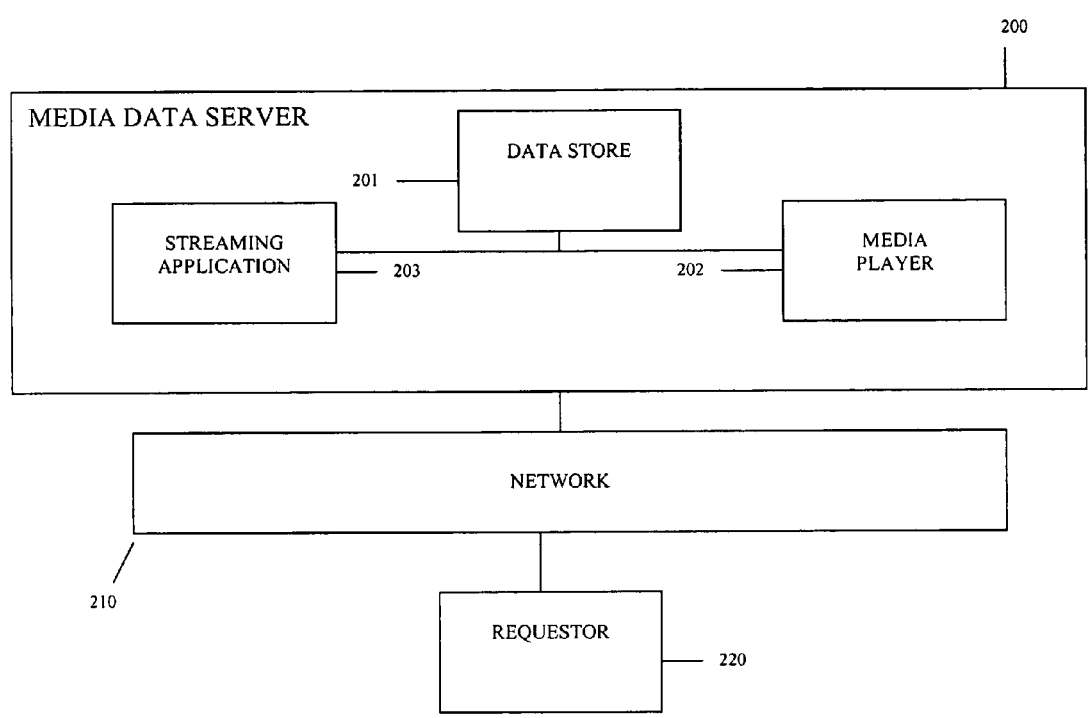
FIG. 2 is a diagram depicting a media data server, in accordance with one embodiment of the invention.

FIG. 2 is a diagram depicting a media data server 200, in accordance with one embodiment of the invention. The media data server 200 is accessible over a network 210 to one or more media data requesters 220 and to one or more media content providers (not shown in FIG. 2). The media data server 200 includes a variety of software applications and resources designed to achieve the processing described herein and below.

The media data server includes a data store 201, a generic instance of a media player 202, and a streaming application 203. The data store 201 houses media data. The media data is not stored in duplicative data formats. That is, only a single instance of the media data resides in the data store 201. This is significant because conventionally media data is stored in a variety of formats in order to service requesters that can only use a specific format associated with a specific media player. With the teachings of this invention, since the media player 202 is sent, or partially sent as discussed above, with the media data operability is ensured and there is no need to store the media data in more than one format. In one embodiment, the media data is natively stored within the data store 201 in an intermediate compressed format.

The media player 202 is software instructions designed to self install and self execute on computing devices of requesters 220. The media player is a generic instance and can be modified based on each request and/or requestor 220 for the media data. Thus, configuration files can be tailored for each instance of the media player 202, where these configuration files direct specific instances of the media player 202 to perform custom processing on specific requestor's computing devices. In this way, a particular instance of the media player 202 can include its own unique encryption algorithm and licensing restrictions. This ensures that the media data is controlled according to the desires of media content providers.

Instances of the media player 202 are streamed to requesters 220 when the media data server 200 receives a request from the requesters for portions of the media data housed in the data store 201. In some embodiments, as discussed above, portions of a media player 202 are available to the requester 220 as a script that when accessed permits the requestor 220 to acquire the remaining portions of the media player 202 from the media data server 200. Once the instances of the media player 202 self install and self execute on the requesters' computing devices, the instances of the media player initiate a streaming dialogue with the streaming application 203 of the media data server 200. During this dialogue, a requestor's connection rate to the media server 200 is determined and a desired pixel resolution for desired portions of the media data is determined. This pixel resolution is then used when compressing the desired portions of the media data prior to streaming.

As was presented above, the pixel resolution can be decreased in which case the physical size of the compressed media data is decreased, or the pixel resolution can be increased in which case the quality of the compressed media data is improved for the corresponding requester 220. Moreover, in some embodiments, other attributes can be custom compressed with the media data, such as sound quality.

In some embodiments, the media data is captured and stored in the data store 201 as it is being recorded from a live broadcast and it is simultaneously custom compressed and streamed to a requestor 220.

With embodiments of the media data server 200, streaming is improved and made more secure, because compression can be customized to improve throughput performance or to improve quality. Moreover, security is achieved through custom distribution of media players 202 which are designed to execute custom dialogues with the media data server 200, to execute custom decryption algorithms, and to enforce custom licensing restrictions.

Figure 3:
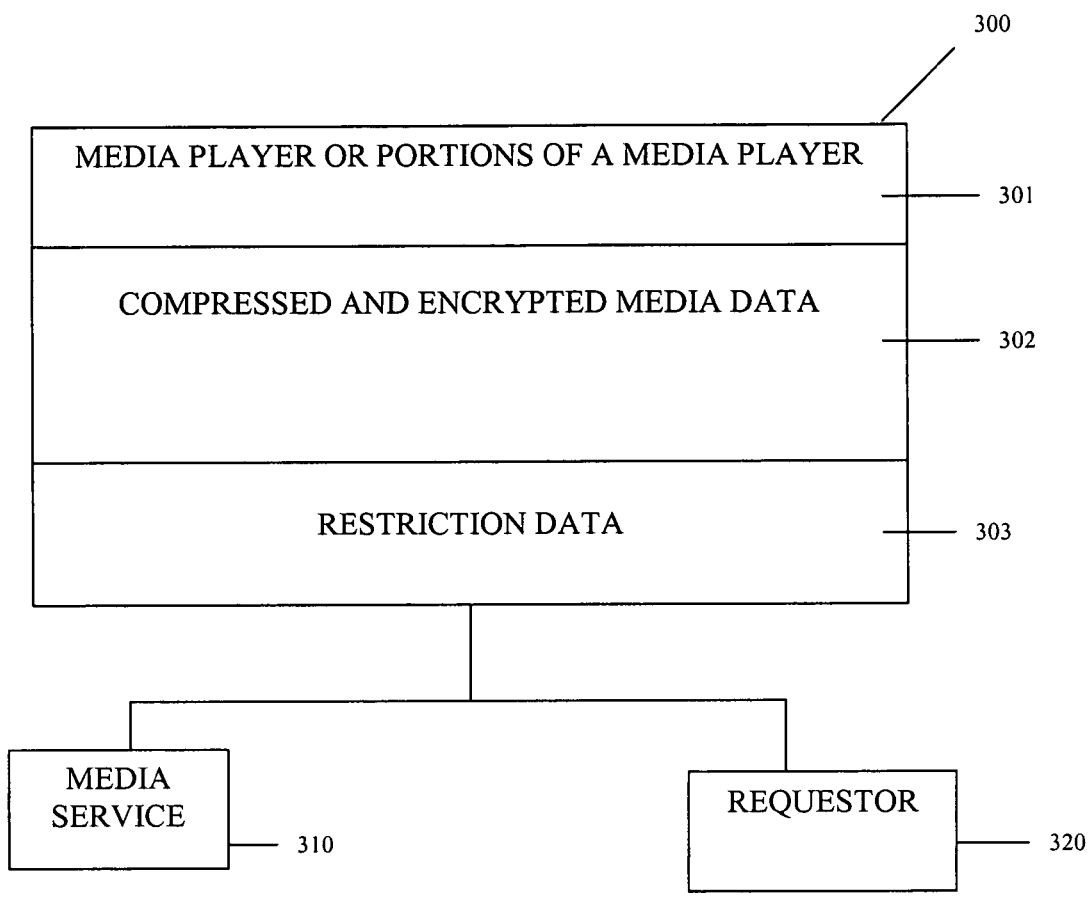
FIG. 3 is a diagram of a media data stream, in accordance with one embodiment of the invention.

FIG. 3 is a diagram of a media data stream 300, in accordance with one embodiment of the invention. The media data stream 300 is implemented in a computer-readable medium and is accessible over a network. The media data stream 300 is created by a media service, such as the media data server 200 of FIG. 2. The media data stream 300 is consumed by a requestor 320.

The media data stream 300 includes all or some portions of a media player 301, a compressed and encrypted media data 302, and optionally restriction data 303. The media player 301 is self installing and self executing from the media data stream 300. That is, once the media player 301 is completely received on a requestor's computing device, it self loads and executes on that computing device and begins a dialogue of communication with the media service 310.

The media player 301 is designed with a unique decryption algorithm and decompression algorithm for decrypting and to decompressing the compressed and encrypted media data 302. In some embodiments, each instance of a media data stream 300 includes its own unique instance of all or portions of the media player 301, such that each request for media data made by a requester 320 requires a unique media player 301 instance to properly consume the media data. This provides an added level of security for protecting against unauthorized use and distribution of the media data. In some embodiments, the media player 301 also uses restriction data 303 that defines licensing rights associated with the media data. In this way, the media player 301 can use the restriction data 303 to ensure that the media data is conforming to licensing restrictions promulgated by a media content provider.

The media player 301 also establishes communication with the media service 320 for purposes of determining a proper pixel resolution or sound quality for the media data being requested by a requestor 320. One technique for doing this is to establish a pixel resolution rate for various connection rates and setting the pixel resolution based on a determined connection rate. The connection rate is associated with communications between the requestor 320 and the media service 310. The connection rate can be affirmatively communicated by the media player 301 to the media service 310 once the media player 301 is executing on the computing device of the requestor 320.

Once a determined pixel resolution and/or sound quality are determined, the media service custom compresses the desired media data having the defined pixel resolution and/or sound quality. In some instances, where resolution or quality is decreased this means that the compressed and encrypted media data 302 will be decreased in size. In other instances, where the resolution or quality is increased this means that the requester 320 will experience improved media data quality during play by the medial player 301.

The media data stream 300 is continuously and dynamically being populated and assembled by the media service 310 and streamed to the requestor 320. That is, the media service 310 does not statically produce a single media data stream 300 before streaming the same over a network to the requestor 320; rather, the media service 310 first customizes and streams the media player 301 and optionally the restriction data 303, and thereafter continuously and regularly streams portions of the compressed and encrypted media data 302 to the requestor 320 for consumption. In some embodiments, the media data that is compressed and encrypted is also acquired dynamically by the media service 310 as it is streaming the same to the requestor 320, such as when the media data is associated with a live broadcast.

It is to be understood that the above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method to process media data, comprising:
receiving a request for media data from a requestor;
compressing the media data using a custom pixel resolution, wherein the custom pixel resolution is determined based on a connection rate of the requestor that is requesting the media data, wherein the connection rate is associated with a rate of transmission for communication over a network with the requestor, and wherein a size of the compressed media data is decreased when the connection rate is increased indicating the custom pixel resolution is lowered and the size of the compressed media data is increased when the connection rate is lowered indicating the custom pixel resolution is increased; and
streaming a media player with the compressed media data to the requestor at the connection rate.

2. The method of claim 1 wherein the compressing further includes receiving the custom pixel resolution from the requestor in response to a query issued to the requestor.

3. The method of claim 1 wherein the compressing and the streaming further include compressing the media data and streaming the compressed media data, wherein the media data is dynamically produced and compressed from a live broadcast.

4. The method of claim 1 wherein the compressing further includes decreasing the custom pixel resolution when the connection rate is lower than a threshold.

5. The method of claim 1 wherein the compressing further includes increasing the custom pixel resolution when the connection rate is higher than a threshold.

6. The method of claim 1 further comprising encrypting the compressed media data before streaming to the requestor.

7. The method of claim 6 wherein the encrypting further includes permitting only the media player which is streamed with the compressed and encrypted media data to know the decryption algorithm necessary to play the media data for the requestor.

8. A media data server, comprising:
a data store having media data;
a media player; and
a streaming application to stream portions of the media data from the data store to a requestor in a compressed format along with the media player that plays the compressed format of the portions of the media data, and wherein the portions of the compressed media data are altered to achieve a custom pixel resolution using and based on a connection rate associated with the requestor, and wherein when the connection rate is increased a size of the compressed media data is decreased and the custom pixel resolution is lowered and when the connection rate is decreased the size of the compressed media data is increased and the custom pixel resolution is increased, and wherein the media player self-loads and executes within an environment of the requestor and is configured to decompress the compressed format of the portions of the media data, and wherein the connection rate is associated with a rate of transmission for communication over a network with the requestor.

9. The media data server of claim 8 wherein the compressed media data is also encrypted and the portions of the media player include the decryption algorithm necessary to decrypt the portions of the media data.

10. The media data server of claim 8 wherein the media data server interacts with the requestor to determine the connection rate.

11. The media data server of claim 8 wherein the media data is stored in a single format and is not duplicated within the data store.

12. The media data server of claim 8 wherein the media data is captured in the data store from a live broadcast and streamed from the data store to streaming application for delivery to the requestor in a compressed format.

13. The media data server of claim 8 wherein the portions of the compressed media data is also encrypted and the encryption technique is customized to correspond with specific instances of the media player.

14. The media data server of claim 8 wherein the media data natively resides within the data store in a compressed format.

* * * * *